US005350197A

United States Patent [19]

Schmidt

[11] Patent Number: 5,350,197

[45] Date of Patent: Sep. 27, 1994

[54] SHOPPING LIST AND DISCOUNT COUPON CORRELATOR

[76] Inventor: Scott A. Schmidt, 77-857 Woodhaven Dr. S., Palm Desert, Calif. 92260

[21] Appl. No.: 192,721

[22] Filed: Feb. 7, 1994

[51] Int. Cl.[5] .................... G09B 19/00

[52] U.S. Cl. .................... 283/56

[58] Field of Search .................... 283/55, 56, 61, 62, 283/63.1; 281/2, 3.1, 5, 10, 45; 402/79

[56] References Cited

U.S. PATENT DOCUMENTS

| | | | |
|---|---|---|---|
| 4,010,964 | 3/1977 | Scheuter | 283/56 |
| 4,643,451 | 2/1987 | Coates | 283/56 |
| 4,685,699 | 8/1987 | Hirasawa | 283/56 X |
| 4,838,580 | 6/1989 | Tuhkanen | 283/56 |

*Primary Examiner*—Mark Rosenbaum
*Assistant Examiner*—William Fridie, Jr.
*Attorney, Agent, or Firm*—Timothy T. Tyson

[57] ABSTRACT

A shopping list (30) is disclosed having structure (22) to hold discount shopping coupons (24) and provide a visual correlation between the coupons and corresponding items (32) on the shopping list.

5 Claims, 3 Drawing Sheets

SHOPPING LIST AND DISCOUNT COUPON CORRELATOR

SUMMARY OF THE INVENTION

The present invention is directed to structure for holding discount coupons and correlating the coupons With selected shopping items.

Apparatus in accordance with the invention are characterized by cardstock or the like arranged to form a pouch for reception of a plurality of coupons and to display shopping item spaces and indicator spaces. Each indicator space is arranged in a spatially corresponding relationship with a different one of the shopping item spaces so that an indicia inserted into an indicator space indicates that a corresponding coupon is in the pouch for that shopping item.

In a preferred embodiment some of the shopping item spaces display printed predetermined shopping items and the remainder are configured for written insertion of selected shopping items.

In accordance with a feature of the invention, the pouch is open along two sides and the cardstock extends away from the pouch in a substantially planar arrangement to facilitate entry into the pouch of coupons that are larger than the pouch.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
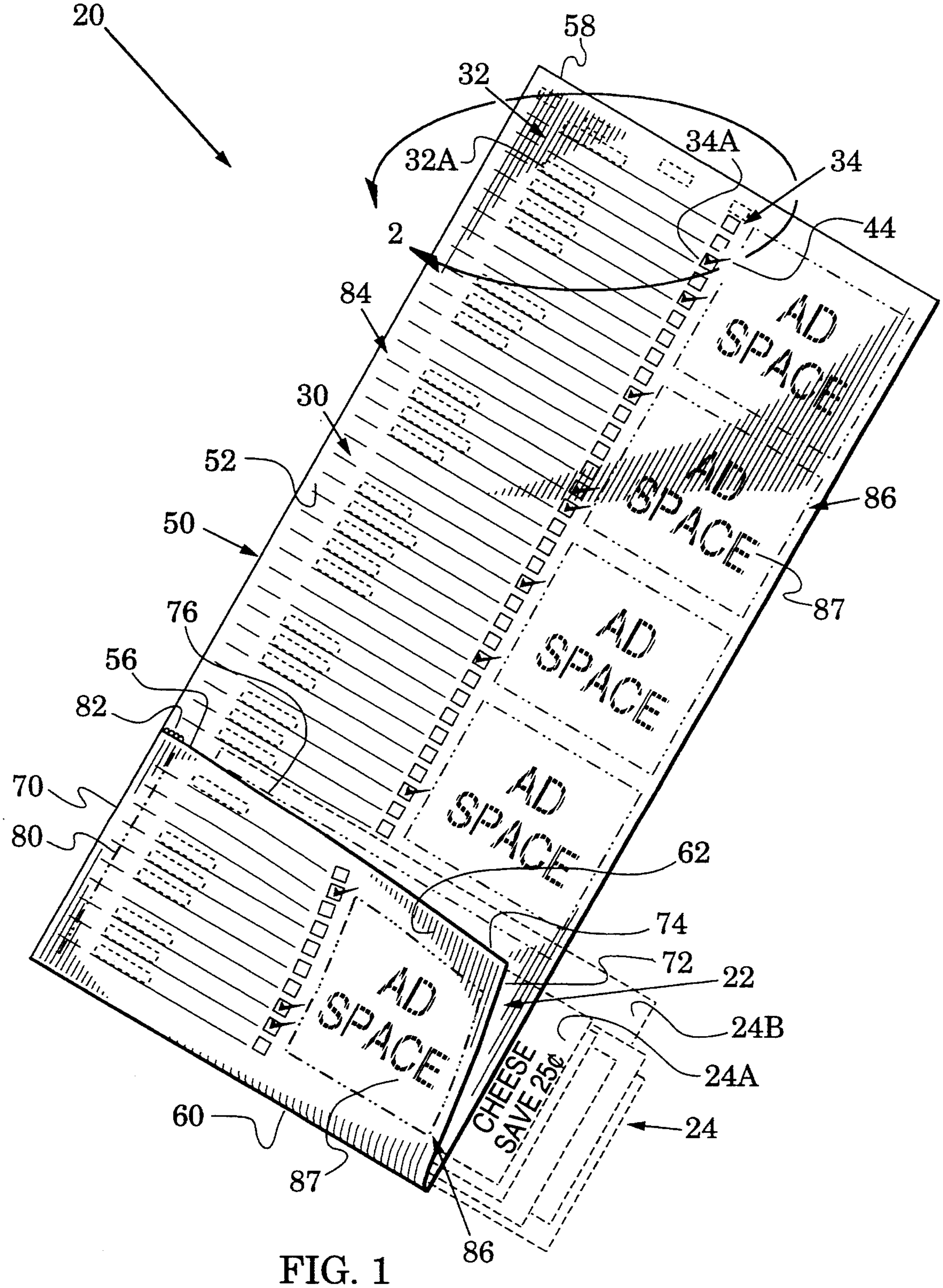
FIG. 1 is perspective view of a preferred shopping list and discount coupon correlator embodiment in accordance with the present invention.
Figure 2:
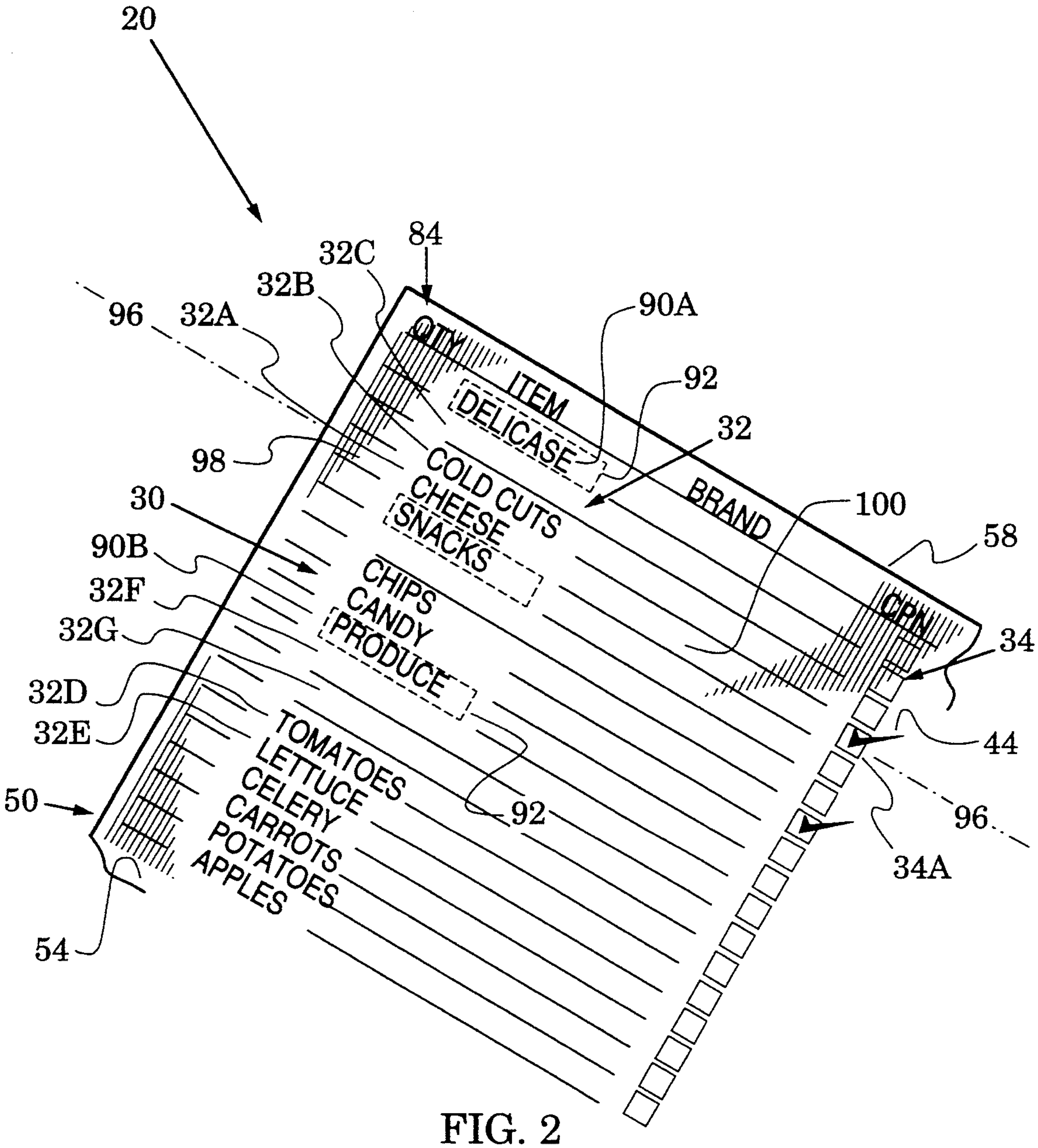
FIG. 2 is an enlarged view of the structure within the curved line 2 of FIG. 1.

FIG. 1 is a perspective view of a preferred embodiment in accordance with the present invention in the form of a shopping list and discount coupon correlator 20. The correlator 20 has a pouch 22 for insertion of discount coupons 24 and, in addition, displays a shopping list 30. The shopping list 30 is shown in more detail in FIG. 2 which is an enlarged view of the structure within the curved line 2 of FIG. 1. FIGS. 1 and 2 show that the shopping list 30 has a plurality of grocery item spaces 32 and a plurality of corresponding coupon indicator spaces 34.

In use of the correlator 20, a shopper can place discount coupons 24 into the pouch 22 and, for each of these coupons, place an indicia such as a check mark into the corresponding one of the coupon indicator spaces 34. For example, in FIG. 1 one of the discount coupons 24 is shown to be a coupon 24A which is good for a 25¢discount on cheese. As an indication that the shopper has placed the cheese discount coupon 24A into the pouch 22, the shopper enters a check mark 44 into the indicator space 34A that corresponds to the grocery item 32A displaying the word "cheese".

The shopper can continue placing discount coupons into the pouch 22 and placing a check mark in the corresponding coupon indicator space 34 for each such coupon. When the shopper arrives at the grocery store, the correlator 20 not only provides a grocery list to shop by but a pouch 22 to hold the selected discount coupons 24 and a series of check marks 44 that visually indicate which selected grocery items have a corresponding coupon 24 in the pouch 22.

This information helps the shopper in his or her planning of a shopping trip and also expedites flow through the checkout line because the check marks 44 and corresponding grocery item spaces 32 provide knowledge of the available coupons. Only those coupons required for the shopping trip and the checkout line are placed in the pouch 22. This significantly simplifies the present practice of many shoppers which includes carrying a great many coupons to the store and subsequently searching through them at the checkout line.

Figure 3:
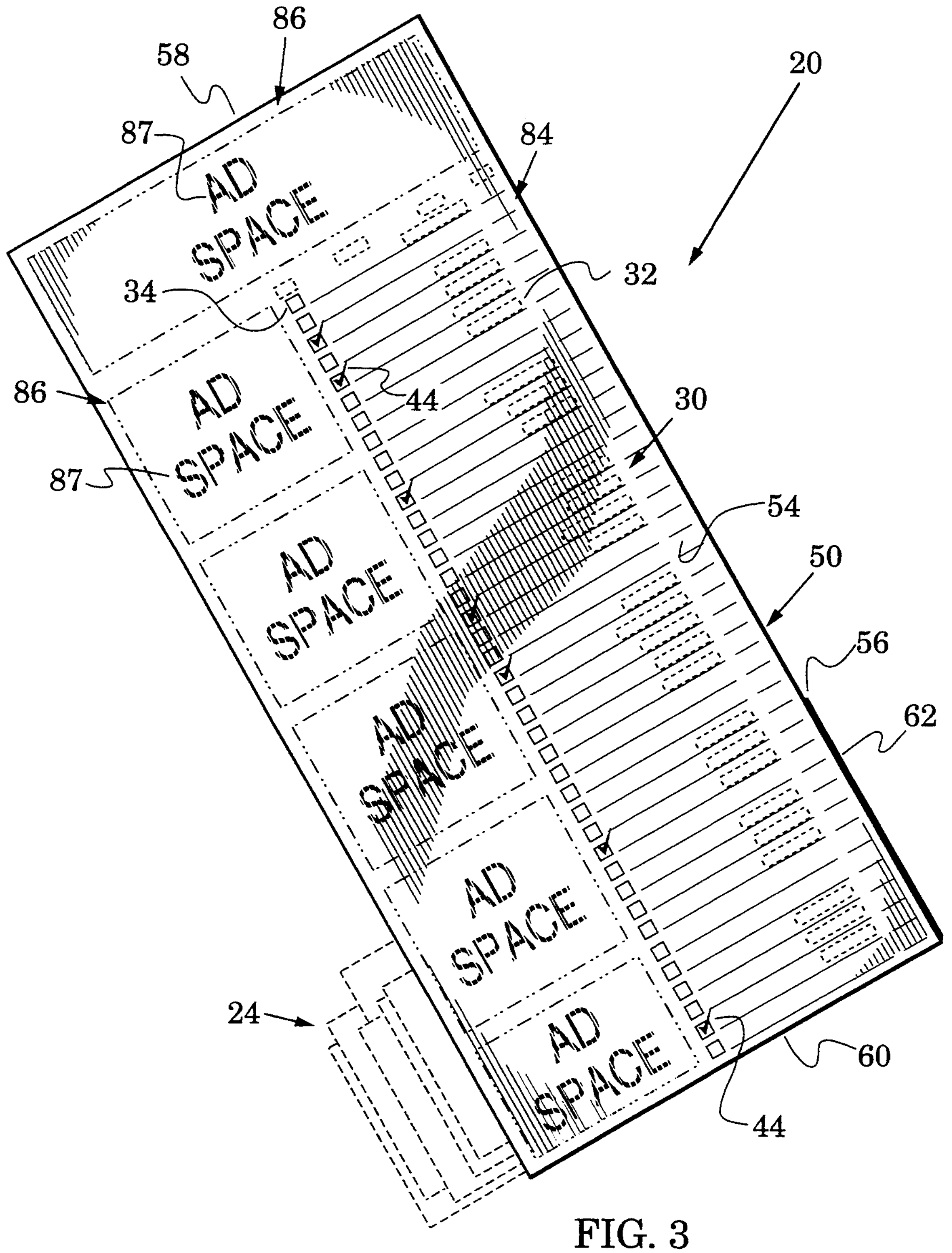
FIG. 3 is a rear perspective view of FIG. 1.

Directing attention now to a detailed description of the preferred embodiment, FIG. I shows that the correlator 20 is made from a sheet 50 of heavy paper, cardstock or the like. The sheet 50 has front and rear faces 52, 54 (54 is shown in FIG. 3 which is a rear view of FIG. 1) that extend longitudinally from an lower end 56 to an upper end 58. A transverse fold line 60 is longitudinally spaced from the lower end 58 to form a flap 62 between the fold line 60 and the lower end 56. The flap 62 is folded upward about the fold line 60 so that the flap 62 adjoins the front face 52. The flap 62 is seen to have first and second transversely spaced edges 70, 72 connected by a transversely spaced upper edge 74 which is positioned against the front face 52 along the broken line 76.

In the preferred embodiment 20, the first flap edge 70 is secured to the front face 52 by application of a bond of adhesive suitable for cardstock. The area of applied adhesive would typically be between the first edge 70 and the parallel broken line 80. For illustrative purposes, a portion of the adhesive 82 is shown extending above the upper flap edge 74. Thus, the pouch 22 is formed between the flap 62, the front face 52 and the secured first edge 70. The pouch 22 is open along the upper flap edge 74 and the second flap edge 72 to facilitate insertion of the discount coupons 24. As more coupons 24 are inserted into the pouch 22, the upper flap edge 74 and second flap edge 72 are free to accommodate the coupons by moving away from the front face 52 to the spacing therefrom shown in FIG. 1.

The front and rear faces 52, 54 each have first portions 84 which display indicia in the form of a shopping list 30 and second portions 86 which display indicia in the form of advertising 87. The enlarged shopping list 30 in FIG. 2 more clearly shows the grocery item spaces 32 and the coupon indicator spaces 34. Some of the grocery item spaces 32 have a printed predetermined grocery item such as "cold cuts" and "cheese" respectively indicated as items 32B and 32A. Others of the grocery item spaces 32 are configured for written entry of selected grocery items by a shopper. For example, in the grocery item space 32C, the shopper might write "sausage". The grocery item spaces 32 are grouped under common headings 90 such as "delicase", "snacks", "produce" and the like. To accentuate the headings, they are printed over a colored background 92 which is indicated by broken line rectangles.

Thus, the printed predetermined grocery item spaces 32A and 32B and the grocery item space 32C configured for written entry are grouped under the heading 90A marked "delicase". In a similar manner, the predetermined grocery items 32D and 32E marked "tomatoes" and "lettuce" and two grocery item spaces 32F and 32G configured for written entry of selected grocery items are grouped under the heading 90B marked "produce". Other typical headings include "household", "toiletries", "dairy", "meats" and "canned food".

Each of the indicator spaces 34 is defined by a open printed box and is positioned in a corresponding spatial relationship with a different one of the grocery item spaces 32. In the preferred embodiment 20, each indicator space 34 and its corresponding grocery item space 32 are arranged along lines 96. Each line 96 begins at the left margin with a space 98 configured for written entry of the quantity to be purchased. Next along each line 96 is the grocery item space 32 followed by a space 100 for written entry of a particular brand name. Each line 96 then terminates at the right margin with the coupon indicator space 34.

In accordance with a feature of the invention, the sheet 50 is substantially planar between the fold line 60 and the upper sheet end 58. This planar arrangement presents a large portion of the shopping list 30 for ready viewing and, additionally, accommodates wider discount coupons such as the coupon 24B shown in FIGS. I and 3. Large coupons can not only extend laterally past the second flap edge 72 but longitudinally beyond the upper flap edge 74. The planar extension upward is enhanced by spacing the lateral fold line 60 further from the upper sheet end 56 than from the lower sheet end 58.

It should be understood that other embodiments may be formed by substitution of equivalent structures, e.g., staples or tabs and corresponding slots may be substituted for adhesive in securing the first flap edge 70 to the front face 52.

From the foregoing it should now be recognized that preferred embodiments of a shopping list and discount coupon correlator have been disclosed herein configured to visually correlate shopping list items with their corresponding collected coupons. Although the preferred embodiment has been illustrated as a grocery shopping list, the teachings of the invention may be extended to other consumer items for which discount coupons are typically available.

The preferred embodiments of the invention described herein are exemplary and numerous modifications, dimensional variations and rearrangements can be readily envisioned to achieve an equivalent result, all of which are intended to be embraced within the scope of the appended claims.

What is claimed is:

1. A shopping list and discount coupon correlator, comprising:

a sheet of cardstock having front and rear faces extending longitudinally between a lower sheet end and an upper sheet end;

a transverse fold line longitudinally spaced from said lower sheet end;

a flap defined by said sheet between said lower sheet end and said transverse fold line, said flap folded about said fold line to adjoin said front face, said flap having transversely spaced first and second edges connected by a transversely directed upper edge;

means for securing said first edge to said front face;

a pouch thereby formed between said flap, said front face and said securing means, said pouch open along said upper edge and said second edge for insertion therein of selected discount coupons;

portions of said front and rear faces each displaying a shopping list that includes a plurality of shopping item spaces and a plurality of coupon indicator spaces wherein some of said shopping item spaces are filled with printed predetermined shopping items and the remainder are configured for written insertion of selected shopping items; and each of said coupon indicator spaces disposed in a corresponding spatial relationship with a different one of said shopping item spaces so that insertion of written indicia into a coupon indicator space indicates that a discount coupon has been inserted in said pouch for the corresponding shopping item.

2. The organizer of claim 1 wherein said sheet is configured to be substantially planar between said fold line and said upper sheet end.

3. The organizer of claim 2 wherein said transverse fold line is longitudinally spaced further from said upper sheet end than from said lower sheet end.

4. The organizer of claim i wherein said securing means comprises an adhesive disposed between said first edge and said front face.

5. A method of correlating a shopping list and discount coupons, comprising the steps of:

providing a sheet of cardstock with front and rear faces extending longitudinally between a lower sheet end and an upper sheet end;

folding a flap between said lower sheet end and a fold line transversely spaced therefrom to adjoin said front face, said flap having transversely spaced first and second edges connected by a transversely directed upper edge;

securing said first edge to said front face to form a pouch between said flap and said front face;

displaying on portions of said front and rear faces a shopping list that includes a plurality of shopping item spaces and a plurality of coupon indicator spaces wherein some of said shopping item spaces are filled with printed predetermined shopping items and the remainder are configured for written insertion of selected shopping items;

disposing each of said coupon indicator spaces in a corresponding spatial relationship with a different one of said shopping item spaces;

inserting discount coupons into said pouch for selected ones of said shopping items; and inserting indicia in those indicator spaces that correspond to the shopping item spaces of said selected shopping items.

* * * * *